Jan. 23, 1940.   R. POLUZZI   2,187,891
APPARATUS FOR WASHING FRUITS, VEGETABLES, AND THE LIKE
Filed Sept. 22, 1937
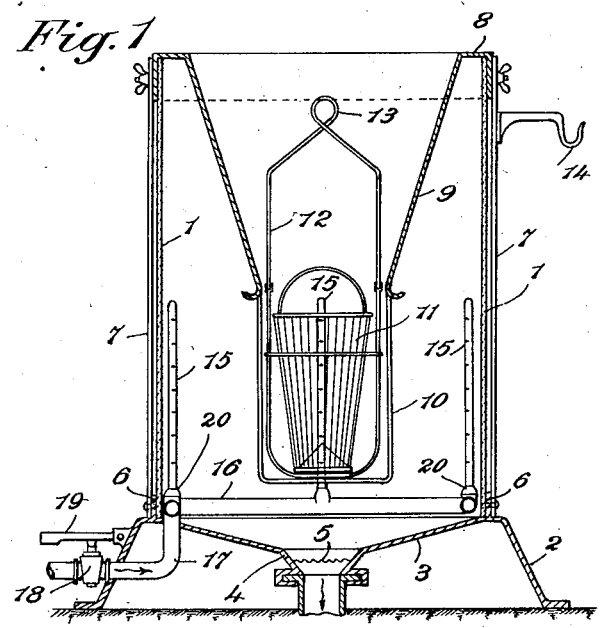
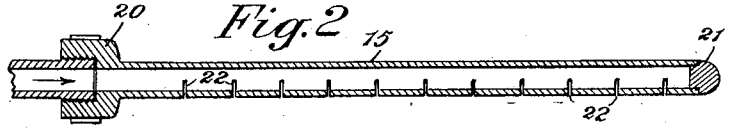
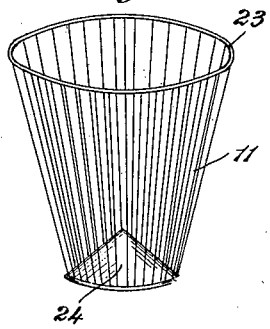
Remo Poluzzi
INVENTOR
By Otto Munk
his ATT'Y.

Patented Jan. 23, 1940

2,187,891

UNITED STATES PATENT OFFICE 2,187,891

APPARATUS FOR WASHING FRUITS, VEGETABLES, AND THE LIKE

Remo Poluzzi, Rome, Italy

Application September 22, 1937, Serial No. 165,053
In Italy October 16, 1936

1 Claim. (Cl. 146—200)

The present invention has for its object to provide an apparatus for washing fruits, vegetables, and the like, in which the latter are introduced, washed and extracted without ever coming in contact with the hands of the person or persons attending to the washing or delivering the goods to the consumer.

The necessity of such apparatus is particularly felt in public establishments such as eating-houses, bars, and the like, as also hospitals, private dwellings, and the like.

The washing apparatus according to invention comprises the following essential parts: a washing vessel, preferably of glass, containing means for supporting the goods to be washed, the latter being introduced collected in baskets or hamper-like openwork structures, and furthermore comprising ejector nozzles for the washing water.

According to a preferred form of realization the invention comprises the following parts:

(a) A glass shell permitting vision of washing operation to consumer with an opening at the top for introducing the fruits or vegetables, and an opening at the bottom for the discharge of the exhaust water.

(b) A water conduit in the interior of the glass shell for feeding various sprayers so arranged as to give the goods a shower bath in all directions.

(c) A movable basket or hamper containing the fruits or vegetables to be introduced into the washing shell, made of network or other open work to permit the water jets to directly wash all round the goods.

Apart from the hygienic point of view the new apparatus is also to be considered as a means of increasing the fruit trade and consumption, as it is clear that it is by far more attractive to the purchaser or consumer to buy a lot of fruits, say a bunch of grapes, thoroughly washed before his own eyes, than the same covered with dust and obviously having passed through many unclean hands and on which flies or other insects are still creeping.

The invention is illustrated in the annexed drawing in which:

Fig. 1 shows a complete fruit washing apparatus with vertical admission of the fruit basket from the top, Figs. 2 and 3 illustrate some details of Fig. 1.

Referring now to Figs. 1, 2 and 3, the fruit washing apparatus comprises a glass vessel or shell 1 mounted on a base 2 centrally shaped as a discharge hopper 3 provided with a discharge nozzle 4 with network 5. To a flange 6 of base 2 vertical rods 7 are secured to secure to base 2 the upper cover 8 centrally formed as a hopper 9. At the under end of hopper 9 bearing hoops 10 are mounted to form a grid on which the basket 11 for fruits or the like is supported by carriers 12 preferably of steel or other metal wire. The basket carrier 12 is provided at the top with a ring-like handle 13 so as to permit of being gripped and suspended, when out of use, on a hook 14 fixed to a suitable part of apparatus.

In the interior of the apparatus a group of sprayer nozzles 15 is mounted vertically on an annular admission tube 16 fed by a tube 17 in which a valve 18 is inserted, controlled by a hand lever 19. Each nozzle 15 is shaped as shown in Fig. 2. Nozzle 15 is a tubular body terminating at one end in a connection ferrule or ring 20 which is internally screw-threaded and closed at its opposite end by a plug 21. In the body of the nozzle 15 are provided, at one side, transverse slots 22 from which the water is emitted in the shape of a fan of laminated jets for strongly sprinkling the whole mass of fruits, vegetables or the like goods contained in basket 11.

Basket 11, as is more clearly shown in Fig. 3, comprises thin metal rods or bars secured at the top to a ring 23 and at the bottom to a base 24 of conical shape in order to facilitate the drain of the water.

Having now particularly described and ascertained the nature of my said invention and in what manner the same is to be performed, I declare that what I claim is:

In an apparatus for washing fruits, vegetables and the like, a substantially cylindrical glass vessel, having its axis disposed in a substantially vertical direction and being open at its top, an open work basket for the goods to be washed, said basket having a size substantially smaller than that of the vessel, means for supporting said basket substantially axially of said vessel, said supporting means including a grid on which the basket rests during the washing operation, a hopper mounted in the open top of the vessel to guide said basket axially onto said grid, a plurality of rod-shaped spray nozzles mounted in said vessel parallel to its axis and being distributed to surround said basket when resting on said grid, means to supply water to said nozzles, and means for discharging the used wash water from said vessel.

REMO POLUZZI.